(12) United States Patent
Goto et al.

(10) Patent No.: US 6,657,408 B2
(45) Date of Patent: Dec. 2, 2003

(54) AIR CONDITIONER

(75) Inventors: Naomi Goto, Shiga (JP); Nobuyuki Nishii, Shiga (JP); Yasufumi Kurahashi, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 24 days.

(21) Appl. No.: 10/162,500

(22) Filed: Jun. 3, 2002

(65) Prior Publication Data

US 2003/0006727 A1 Jan. 9, 2003

(30) Foreign Application Priority Data

Jun. 6, 2001 (JP) ......................................... 2001-170598

(51) Int. Cl.[7] .............................. H02P 1/00; F25B 1/00; H02J 1/04; G05F 1/40
(52) U.S. Cl. ..................... 318/442; 318/139; 318/433; 318/436; 62/228.1; 62/244; 320/1; 320/166; 323/288; 323/908
(58) Field of Search ................................. 318/442, 441, 318/440, 139, 432, 433, 436; 62/228.1, 230, 228.5, 243, 244; 320/166, 167, 1; 388/856, 857, 858; 323/282, 284, 288, 908

(56) References Cited

U.S. PATENT DOCUMENTS

| | | | | |
|---|---|---|---|---|
| 5,179,842 A | * | 1/1993 | Kanazawa | .................... 62/230 |
| 5,408,842 A | * | 4/1995 | Goto et al. | .................... 62/230 |
| 5,428,967 A | * | 7/1995 | Goto et al. | .................... 62/230 |
| 5,619,107 A | * | 4/1997 | Shinohara et al. | ........... 318/139 |
| 5,714,806 A | * | 2/1998 | Goto et al. | .................... 62/244 |
| 5,715,154 A | * | 2/1998 | Rault | .......................... 323/908 |
| 5,929,591 A | * | 7/1999 | Katou et al. | .................. 318/723 |
| 6,002,220 A | * | 12/1999 | Takahashi et al. | ........... 318/139 |
| 6,049,185 A | * | 4/2000 | Ikeda | .......................... 318/442 |
| 6,075,328 A | * | 6/2000 | Notohara et al. | ............. 318/254 |
| 6,384,558 B2 | * | 5/2002 | Yoshida et al. | .............. 318/445 |
| 6,539,739 B2 | * | 4/2003 | Goto et al. | .................... 62/244 |

FOREIGN PATENT DOCUMENTS

| | | | | |
|---|---|---|---|---|
| JP | 57025016 A | * | 2/1982 | ............. G05F/5/00 |
| JP | 06327245 A | * | 11/1994 | ............. H02M/3/28 |
| JP | 07061230 A | * | 3/1995 | ............. B60H/1/32 |
| JP | 2000289452 A | * | 10/2000 | ............. B60H/1/32 |
| JP | 2002369510 A | * | 12/2002 | ........... H02M/3/155 |

\* cited by examiner

*Primary Examiner*—Robert E. Nappi
*Assistant Examiner*—Edgardo San Martin
(74) *Attorney, Agent, or Firm*—RatnerPrestia

(57) ABSTRACT

In an air conditioner having a control unit receiving a power from a switching power supply, a supplied voltage for the control unit is reduced to a possible lowest voltage for the unit to operate. This arrangement provides the air conditioner with less electromagnetic wave noise of the switching power supply, with a quick check and repair, and with having a motor-driven compressor quick start.

3 Claims, 15 Drawing Sheets

AIR CONDITIONER

FIELD OF THE INVENTION

The present invention relates to an air conditioner including a motor-driven compressor operated with power supplied from a DC power source.

BACKGROUND OF THE INVENTION

A conventional air conditioner for vehicles including a motor-driven compressor operated with power supplied from a DC power source is shown in FIG. 14. The air conditioner includes output unit 11 for DC/AC-converting a DC current for supply an AC current to motor-driven compressor 14, and capacitor 7 for smoothing the DC current of rectangular waveform. While breaker 3 being closed, the capacitor 7 is charged by battery 1 via fuse 2, breaker 3, and reverse-connection-protecting diode 4 through a charge resistor 5 for preventing a charge inrush current. The reverse-connection-protecting diode 4 protects the circuit by cutting off the current if the battery 1 is connected in reverse polarity.

Control unit 10, upon receiving a command to operate the motor-driven compressor 14 from air-conditioner controller 12, detects the charge of capacitor 7 and closes relay 6, for example, when the voltage of capacitor 7 detected by voltage detector 8 reaches a predetermined level. Then, the control unit 10 instructs the output unit 11 to drive the motor-driven compressor 14. The control unit 10 is supplied with power from 12V power source 13. Switching power supply 9 converts the voltage of battery 1 to supply the power to the output unit 11 and voltage detector 8. Control unit 10, upon receiving a command to stop the motor-driven compressor 14 from the air-conditioner controller 12, stops the output of the output unit 11 and opens the relay 6.

The control unit 10 is always in operation since receiving a power from 12V power source 13. Accordingly, the unit is always possible to communicate with controller 12, receive a signal from a sensor for air conditioning, and check the circuit with a circuit-checking device.

FIG. 15 is a circuit diagram of another conventional air conditioner. The control unit 10 receives a power from switching power supply 9, and receives no power from 12V power source 13. The conditioner has a simple structure in which a connection with 12V power source 13 is not needed, and a common ground can be used for the control unit 10 and other circuits. Constant current charging circuit 15 supplies a constant current obtained through subtracting a base-emitter voltage of a transistor from a zener voltage of a zener diode and dividing it by a resistance of an emitter resistor. For example, in cases that the zener voltage is 17V, that the base-emitter voltage 2V, and that the resistance is 50 ohm, the constant current is 0.3A.

If capacitor 7 is not charged for the case of being out of order, the voltage of capacitor 7 is 0V, and the supply voltage of switching power supply 9 connected in parallel with capacitor 7 is also 0V. In that case, switching power supply 9 is not in operation, and the control unit 10 receiving a power from switching power supply 9 is not in operation, either. Accordingly, control unit 10 cannot check the circuit, communicate with air controller 12, or receive the signal from the sensor before capacitor 7 is charged. The conventional conditioner in FIG. 14 involves no problems because the control unit 10 is always in operation. The conditioner in FIG. 15 has a similar problem even in case charge resistor 5 is provided in place of constant-current charging circuit 15.

While motor-driven compressor 14 is not in operation, capacitor 7 is preferably discharged for energy saving and operation time shortening in order to enhance the lifetime of the conditioner. However, if capacitor 7 is discharged, the control unit 10 does not operate as described above. In the conditioner shown in FIG. 14, the capacitor 7 is discharged with opening breaker 3, but there arises no problem because the control unit 10 is always in operation.

If capacitor 7 is discharged while motor-driven compressor 14 is not in operation, the capacitor 7 needs to be charged before start operating the motor-driven compressor 14, thus requiring time for motor-driven compressor 14 to start operating. This problem is common to the conditioner in FIG. 14.

SUMMARY OF THE INVENTION

In an air conditioner having a control unit receiving a power from a switching power supply, a supplied voltage for the control unit is reduced to a possible lowest voltage for the unit to operate. This arrangement provides the conditioner with less electromagnetic wave noise of the switching power supply, with a quick check and repair, and with having a motor-driven compressor start quickly. The air conditioner includes: a power application device connected in series to a direct-current (DC) power source; a switch device connected in parallel with the power application device; a capacitor charged by the DC power source via the power application device; a voltage detector for detecting a voltage of the capacitor; an output unit for driving a motor-driven compressor for air conditioning, the output unit receiving a power from the DC power source via the switch device; a control unit for controlling the output unit; a power supply connected in parallel with the capacitor, for supplying a power to the control unit, the power supply receiving a power from the DC power source; and a voltage lowering device for, when the motor-driven compressor does not operate, setting the voltage of the capacitor to a voltage which is lower than a voltage of the DC power source and which allows the control unit to operate. The voltage lowering device being controlled by the controller.

DESCRIPTION OF THE PREFERRED EMBODIMENT (Embodiment 1)

Figure 1:
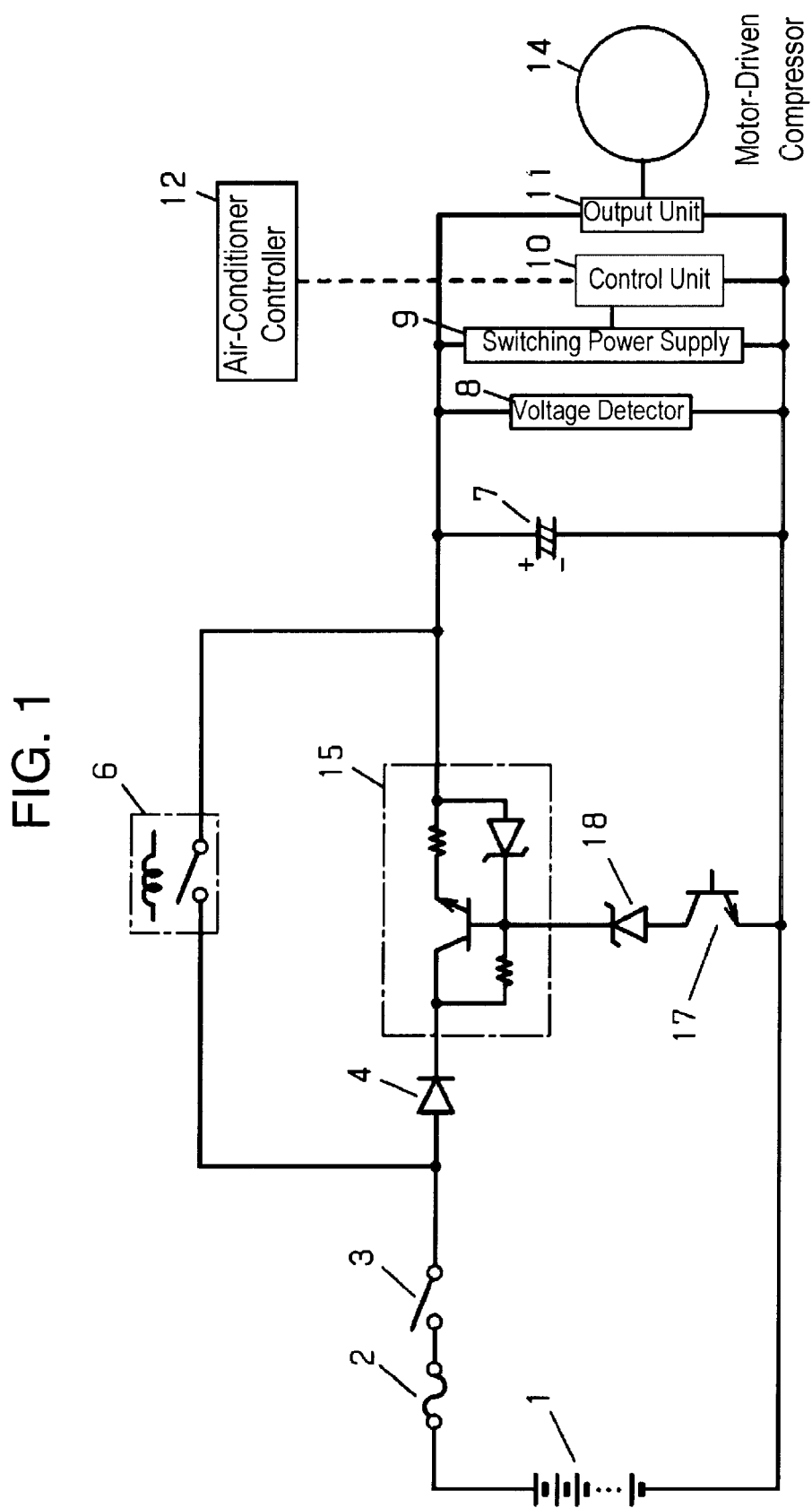
FIG. 1 is a circuit diagram of an air conditioner according to a first exemplary embodiment of the present invention.
Figure 14:
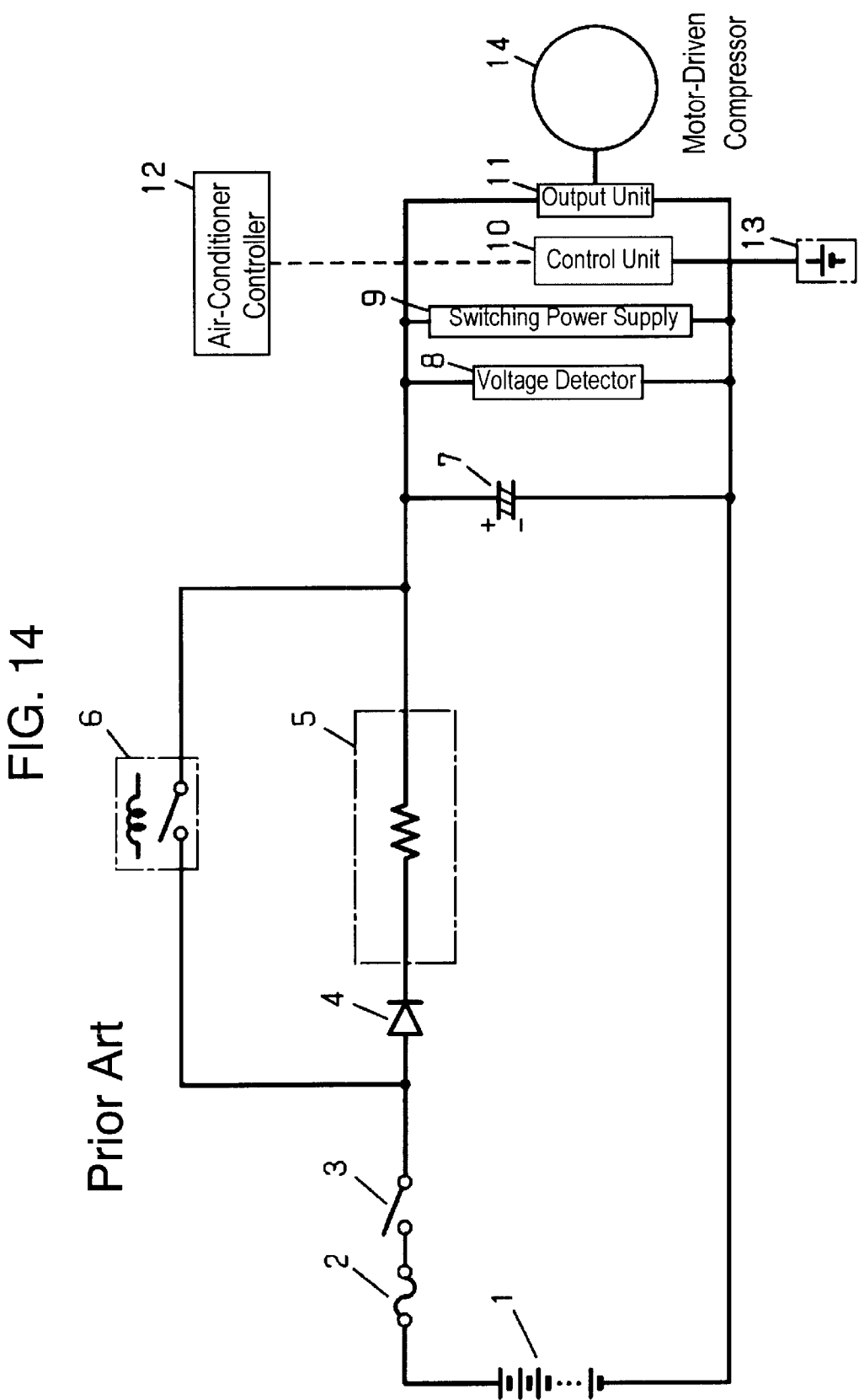
FIG. 14 is a circuit diagram of a conventional air conditioner.

FIG. 1 is a circuit diagram of an air conditioner in a first exemplary embodiment of the present invention. Differently from the conventional air conditioner of FIG. 14, the air conditioner includes a constant-current-charging circuit 15 in place of charging resistance 5 as a power application device, and a transistor 17 and zener diode 18 as a voltage-lowering device. The constant-current-charging circuit 15 applies a constant current obtained by subtracting a base-emitter voltage of the transistor from a zener voltage of the zener diode and dividing the resultant voltage by an emitter resistance. For example, the zener voltage of 17V, the base-emitter voltage of 2V, and the emitter resistance of 50Ω give the constant current of 0.3A.

Breaker 3 being closed, battery 1 charges capacitor 7 via constant-current-charging circuit 15 for preventing the capacitor from an inrush charge current through fuse 2, breaker 3, and reverse connection protecting diode 4.

Upon receiving a command to operate motor-driven compressor 14 from air controller 12, control unit 10 detects a charge of capacitor 7, for example, detects that the voltage of capacitor 7 detected by voltage detector 8 reaches the specified level, and then closes relay 6. Then, control unit 10 instructs output unit 11 to drive motor-driven compressor 14. Switching power supply 9 converts a voltage of battery 1 to supply a power to control unit 10, output unit 11 and voltage detector 8.

Upon receiving a command to stop motor-driven compressor 14 from air controller 12, control unit 10 stops an output of output unit 11 and opens relay 6. Control unit 10 turns on transistor 17 in order to lower the voltage of capacitor 7. Thus, a base voltage of the transistor of constant current charging circuit 15 is fixed to a zener voltage of zener diode 18. Then, to the capacitor 7, a voltage obtained by subtracting the base-emitter voltage of the transistor and a voltage of an emitter resistance of constant-current-charging circuit 15 from the zener voltage of zener diode 18. A voltage of capacitor 7 (the zener voltage of zener diode 18) is determined so that the control unit 10 is able to operate, thus enabling the control unit to operate.

Figure 4:
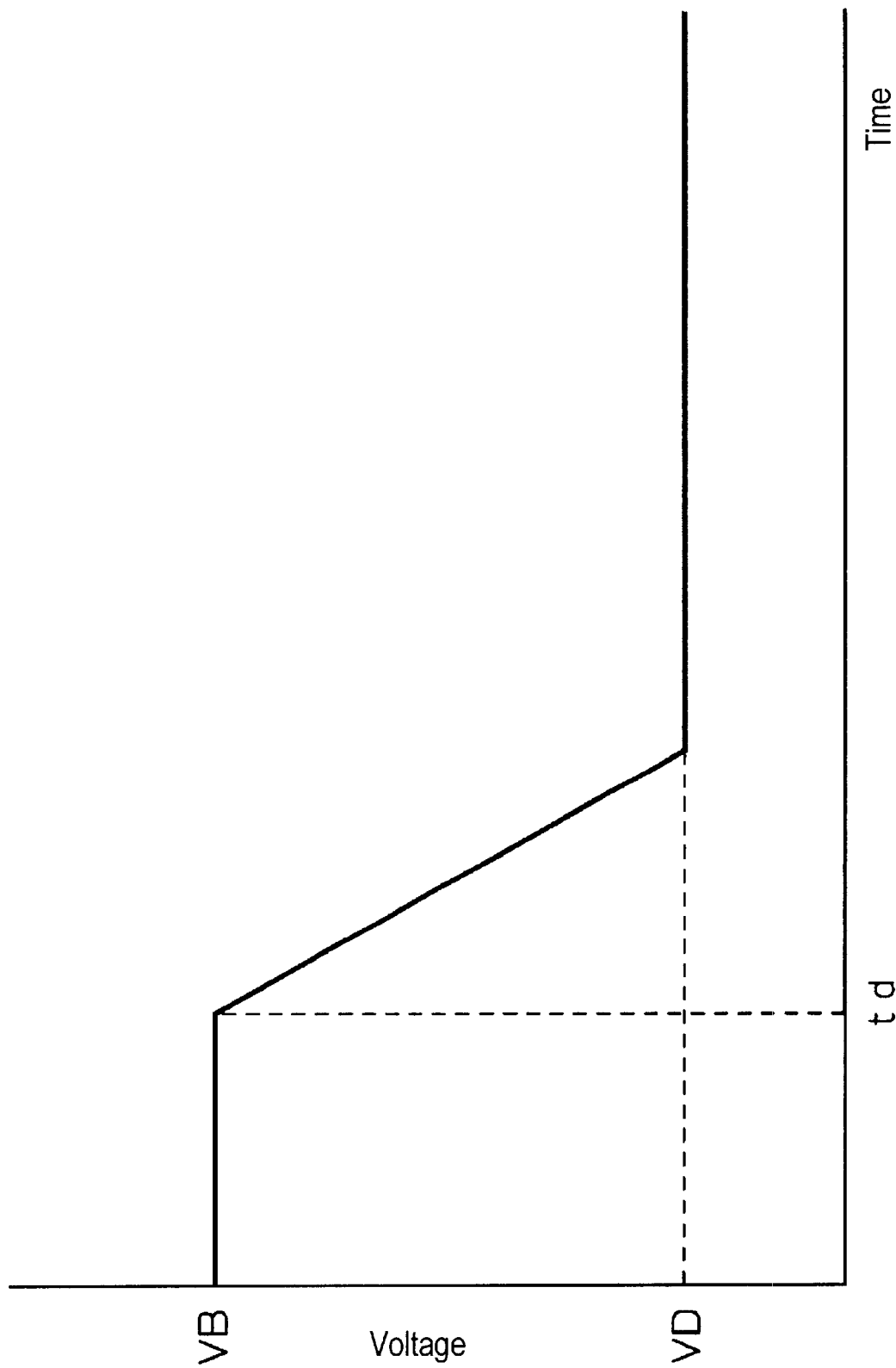
FIG. 4 shows a voltage of a capacitor of the air conditioner according to the first to third embodiments.

FIG. 4 shows the voltage of capacitor 7. Voltage VB is a voltage of battery 1, and voltage VD is the voltage of fixed capacitor 7, that is, the voltage obtained by subtracting the base-emitter voltage of the transistor and the emitter resistance voltage in the constant-current-charging circuit 15 from the zener voltage of zener diode 18. For example, in constant-current-charging circuit 15, the zener voltage of zener diode 18 of 40V and a current of switching power supply 9 of 40 mA gives voltage VD as follows:

$$VD = 40V - 2V - 50\Omega \times 40\ mA = 36V$$

This arrangement allows constant-current-charging circuit 15 to function as a stabilized direct-current (DC) power supply of 36V. Control unit 10 turns on transistor 17 at time td, and then, capacitor 7 starts to be discharged. Capacitor 7 may be discharged by a power consumption of additional circuits such as switching power supply 9 or by any other method. The voltage of capacitor 7 gradually decreases to the level of VD.

Figure 5:
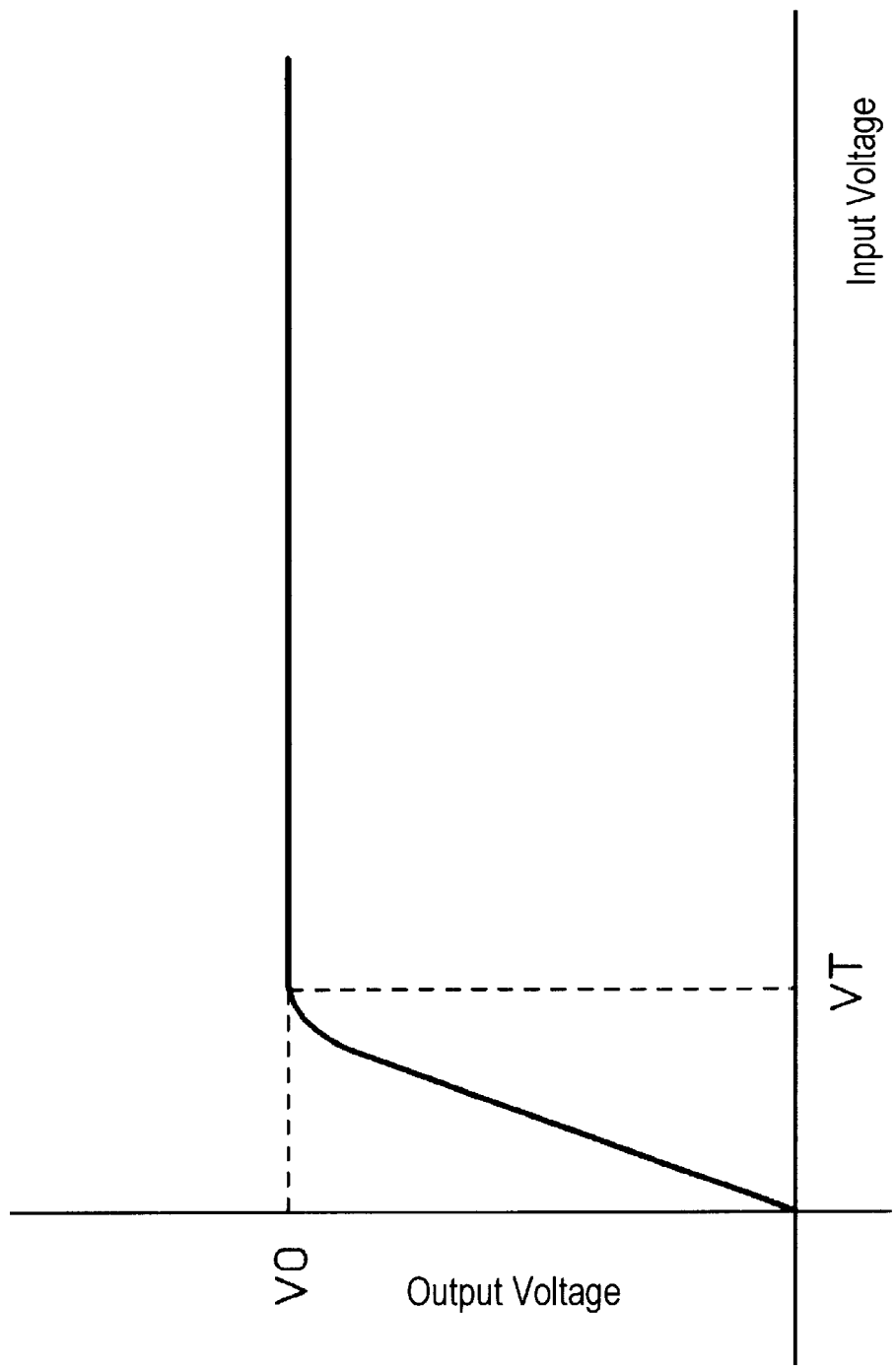
FIG. 5 is a characteristic diagram of a switching power supply of the air conditioner according to the first to third embodiments.

FIG. 5 is a characteristic diagram of input and output voltages of switching power supply 9. When the input voltage is lowered to voltage VT, output voltage VO starts to decrease. Accordingly, it is necessary to set voltage VD higher than voltage VT. In the case that an operating voltage of control unit 10 is lower than voltage VO, voltage VD may be lower.

Figure 6:
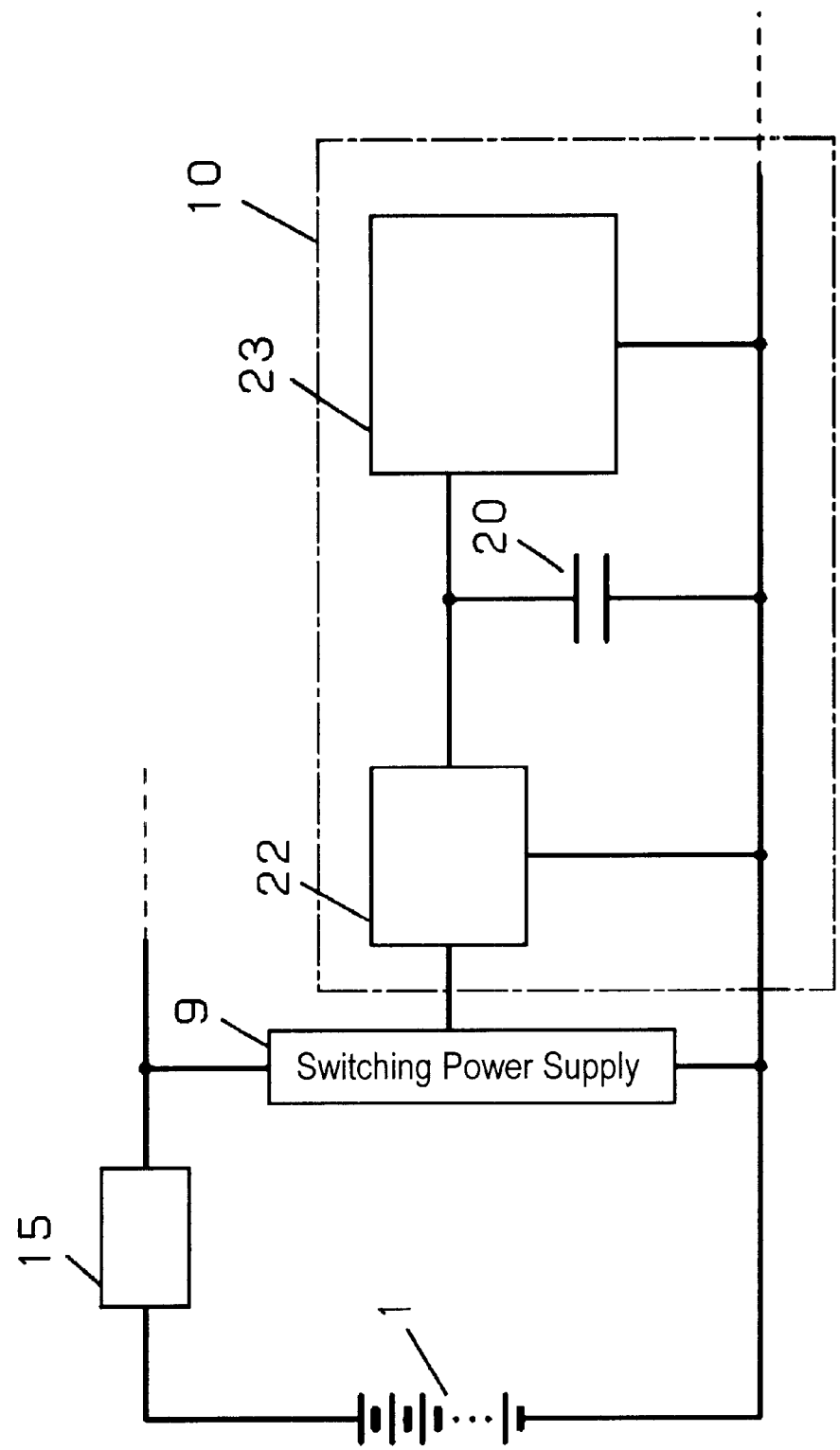
FIG. 6 is a peripheral circuit diagram of a microcomputer of a control unit of the air conditioner according to the first to third embodiments.

FIG. 6 is a peripheral circuit diagram of a microcomputer of control unit 10. Control unit 10 includes voltage stabilizing circuit 22, power supply capacitor 20, and microcomputer 23. An output voltage of switching power supply 9 is connected to voltage stabilizing circuit 22. Voltage stabilizing circuit 22 generates stabilized voltage VOM, which is lower than the input voltage, to the microcomputer 23.

Figure 7:
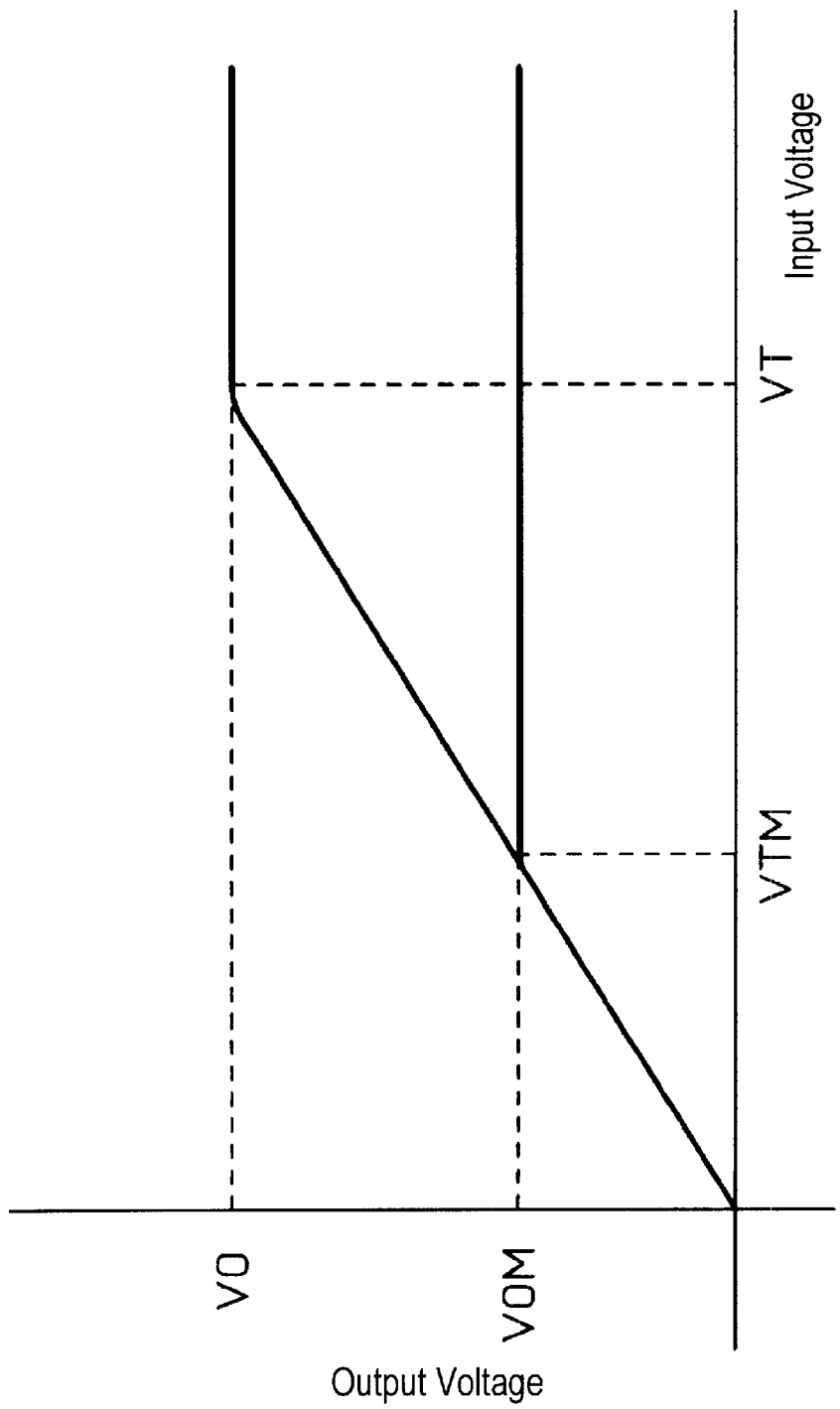
FIG. 7 is an output voltage characteristic diagram of the switching power supply and a voltage stabilizing circuit of the air conditioner according to the first to third embodiments.

FIG. 7 is a characteristic diagram of output voltages of switching power supply 9 and voltage stabilizing circuit 22. The voltage necessary for operating control unit 10 (microcomputer 23) is voltage VOM. Control unit 10 is able to function even when the output voltage of switching power supply 9 is lower than VO as long as the output voltage of voltage stabilizing circuit 22 keeps being voltage VOM. Therefore, the input voltage of switching power supply 9 can be lowered to voltage VTM. Accordingly, voltage VD is set to being higher than voltage VTM.

According to the configuration described above, an electromagnetic wave noise of switching power supply 9 decreases since the voltage of capacitor 7 is lower than the voltage of battery 1. That is, both the switching frequency and pulse voltage decrease. In inspection and repair of the air conditioner after discharging capacitor 7, the inspection and repair are executed fast since a voltage lower than the voltage of battery 1 is discharged. Motor-driven compressor 14 operating after charging capacitor 7 starts operating quickly since capacitor 7 charged from a voltage which is not 0V.

(Embodiment 2)

Figure 2:
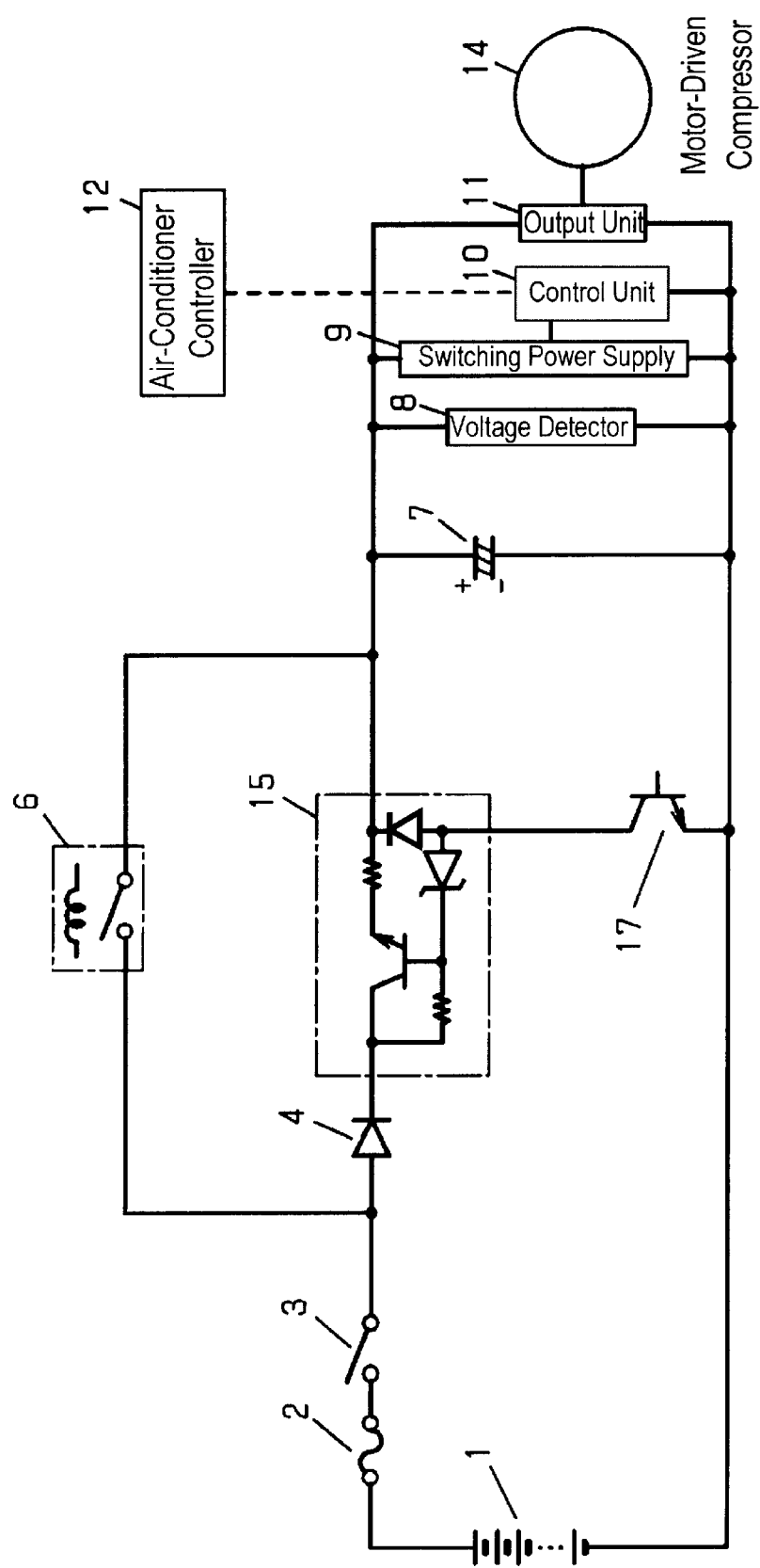
FIG. 2 is a circuit diagram of an air conditioner according to a second exemplary embodiment of the invention.

In FIG. 2, with respect to the air conditioner of FIG. 1, zener diode 18 is deleted and transistor 17 is connected to an anode of a zener diode in constant-current-charging circuit 15. In constant-current-charging circuit 15, a diode is connected from the anode of the zener diode to an emitter resistance. When transistor 17 is turned on, a base voltage of a transistor in the constant current charging circuit 15 is fixed to a zener voltage of the zener diode in constant-current-charging circuit 15. For example, a base-emitter voltage of constant-current-charging circuit 15 of 2V, the emitter resistance of constant-current-charging circuit 15 of 50Ω, a current of switching power supply 9 of 40 mA, and a voltage of the zener diode in constant-current-charging circuit 15 of 17V gives fixed voltage VD of capacitor 7, that is, voltage VD obtained by subtracting the base-emitter voltage of the transistor and an emitter resistance voltage in constant-current-charging circuit 15 from the zener voltage of zener diode 18 as follows:

$$VD=17V-2V-50\Omega \times 40 \, mA=13V$$

The conditioner mentioned above has a simple configuration only with the diode in constant-current-charging circuit 15 and transistor 17 added thereto, which provides the conditioner with similar advantages to the air conditioner according to embodiment 1.

(Embodiment 3)

Figure 3:
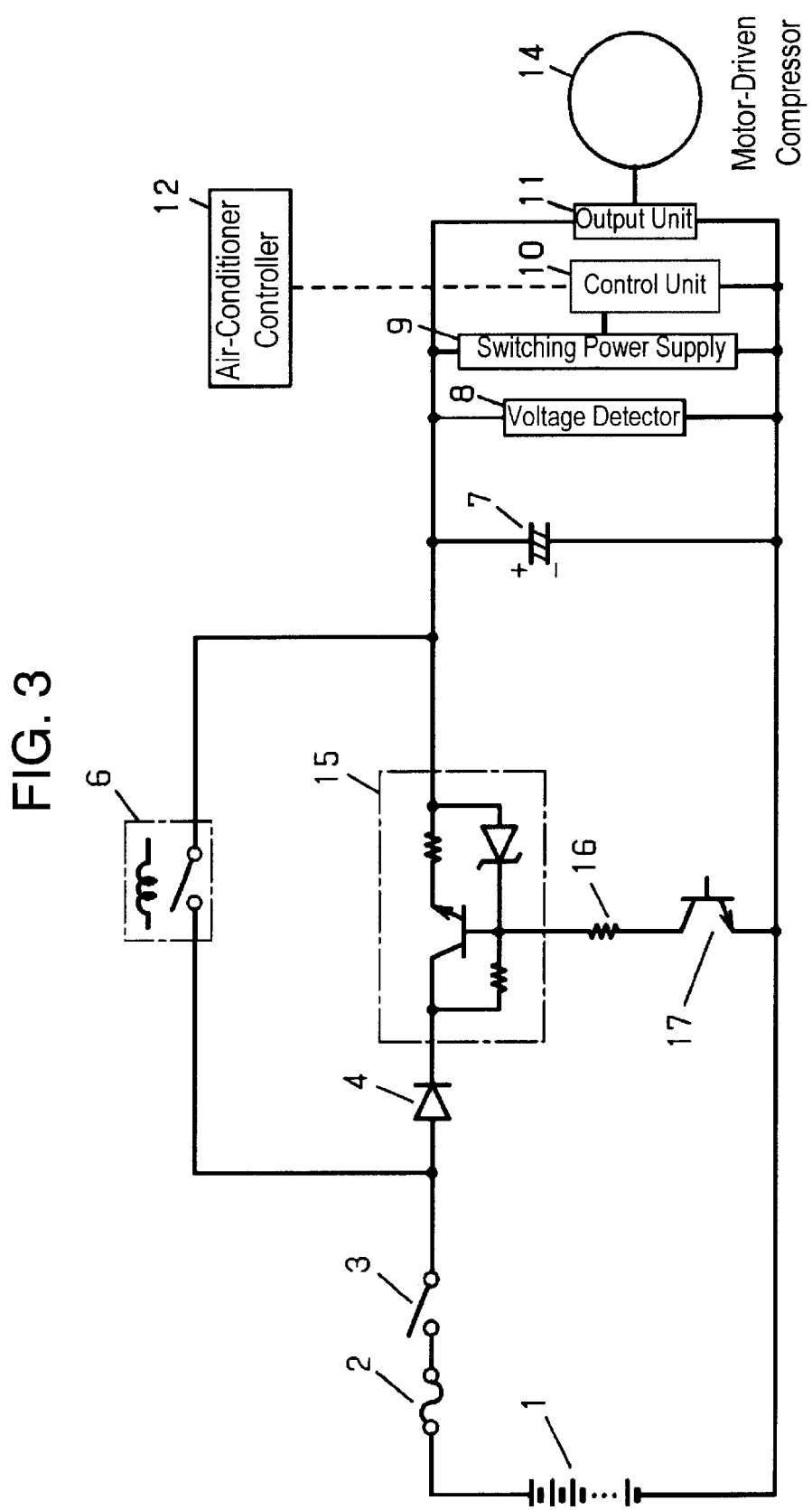
FIG. 3 is a circuit diagram of an air conditioner according to a third exemplary embodiment of the invention.

FIG. 3 is a circuit diagram of an air conditioner according to a third exemplary embodiment of the present invention. The air conditioner includes bleeder resister 16 in place of zener diode 18 in the air conditioner of FIG. 1. A base voltage of a transistor in constant-current-charging circuit 15 is fixed to a voltage obtained by dividing a voltage of battery 1 by a resistance of a base resistor of a transistor in constant-current-charging circuit 15 and a resistance of bleeder resistor 16. This configuration provides the conditioner with similar advantages to the air conditioner of embodiment 1 of the invention.

(Embodiment 4)

Figure 8:
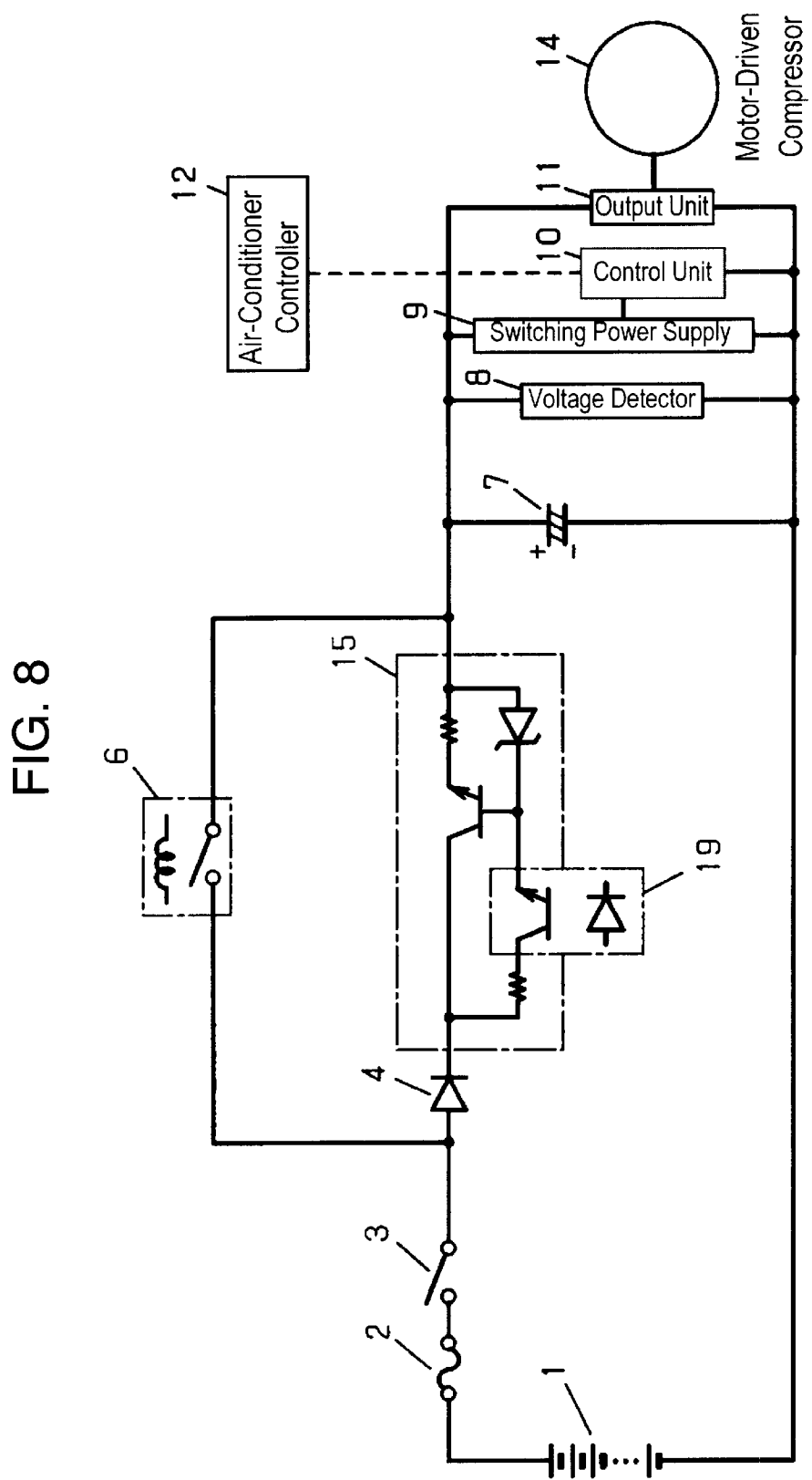
FIG. 8 is a circuit diagram of an air conditioner according to a fourth exemplary embodiment of the invention.
Figure 15:
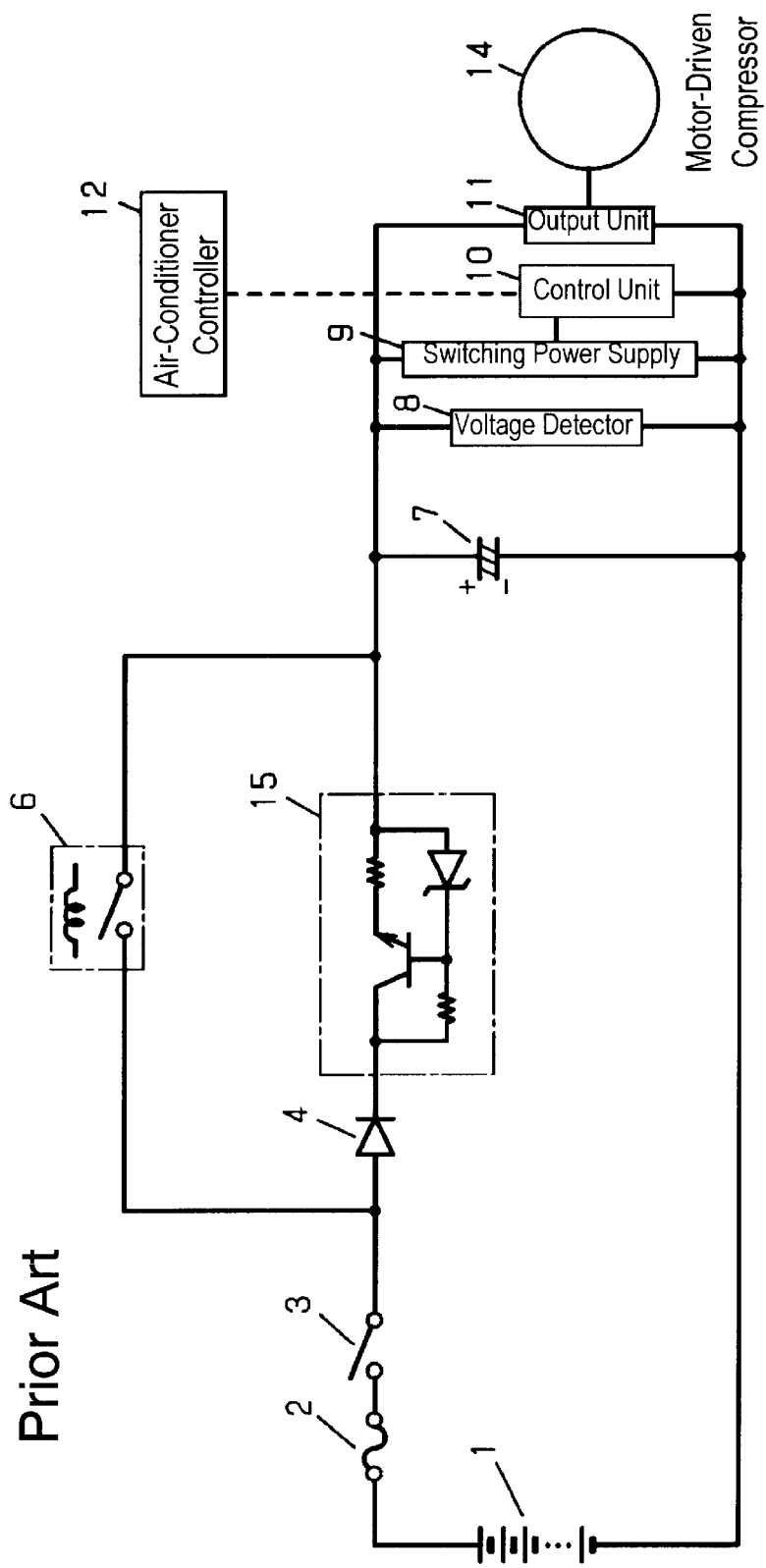
FIG. 15 is a circuit diagram of another conventional air conditioner.

FIG. 8 is a circuit diagram of an air conditioner according to a fourth exemplary embodiment of the present invention. In this air conditioner, charge-ON/OFF photocoupler 19 which can turn on and off a charging function of constant-current-charging circuit 15 is added to the conventional air conditioner of FIG. 15. When a power is applied to turn on an LED, photocoupler 19 connects a base of a transistor of constant-current-charging circuit 15 to the base resistor since the phototransistor is turned on, thus enabling a power to be applied to the transistor. When the power is turned off to have the LED turned off, the power applied to the transistor is turned off, and then, charging of the capacitor 7 is discontinued.

Figure 11:
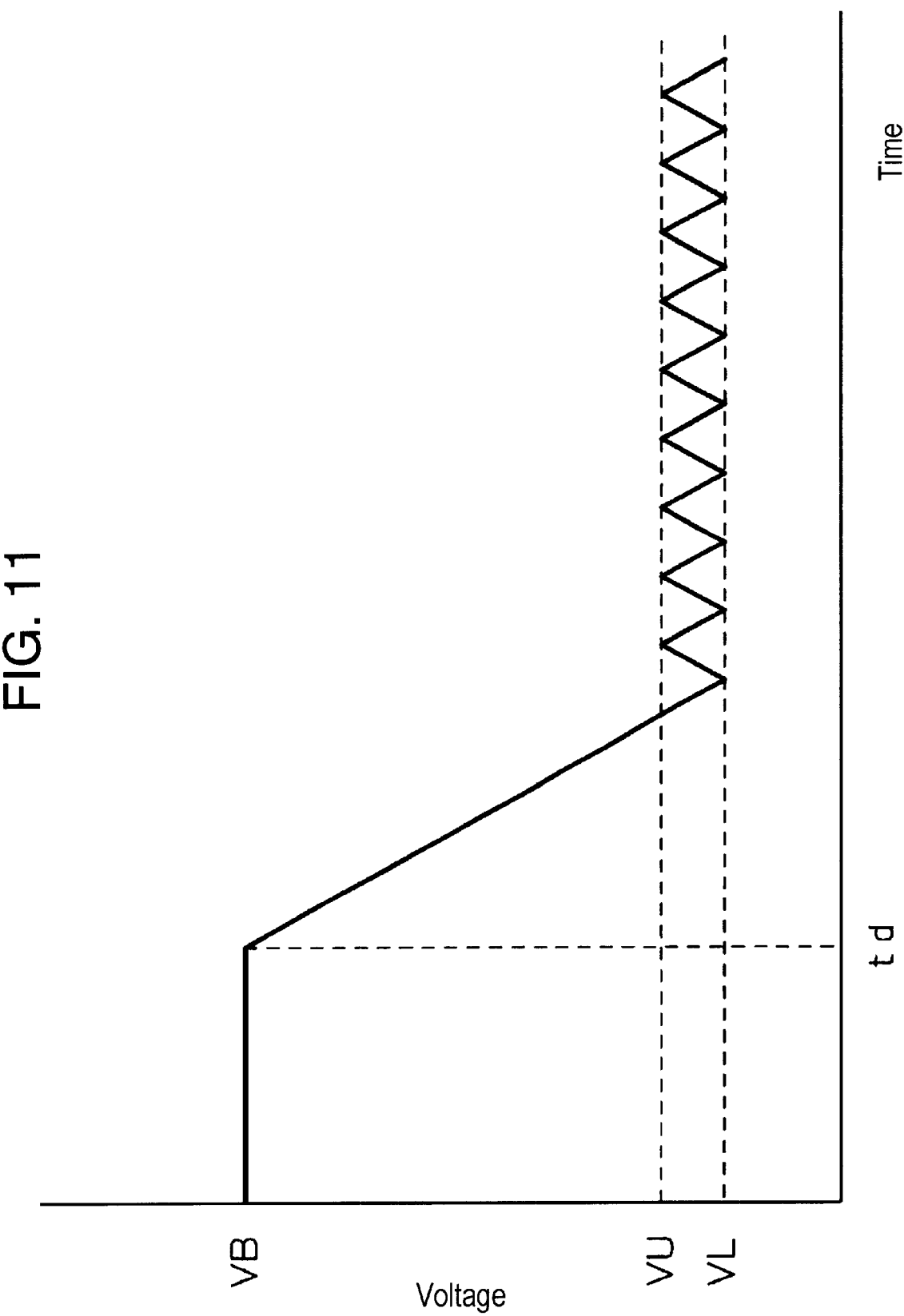
FIG. 11 is a voltage diagram of a capacitor of the air conditioner according to the fourth to sixth embodiments.

FIG. 11 is a voltage diagram of capacitor 7. At time td, control unit 10 stops a power applied to the LED of charge-ON/OFF photocoupler 19. Capacitor 7 starts to be discharged, and the voltage of capacitor 7 is gradually lowered. When the voltage of capacitor 7 reaches voltage VL, control unit 10 applies a power to the LED of photocoupler 19, and thereby, the voltage of capacitor 7 increases. When the voltage of capacitor 7 reaches voltage VU, control unit 10 stops the power applied to the LED of photocoupler 19, and thereby, the voltage of capacitor 7 decreases. With these operations repeated, the voltage of capacitor 7 is maintained between voltage VU and voltage VL. Voltage VL is set to a voltage (e.g. voltage VTM in FIG. 7) at which control unit 10 can operate, and accordingly, control unit 10 operates.

Figure 12:
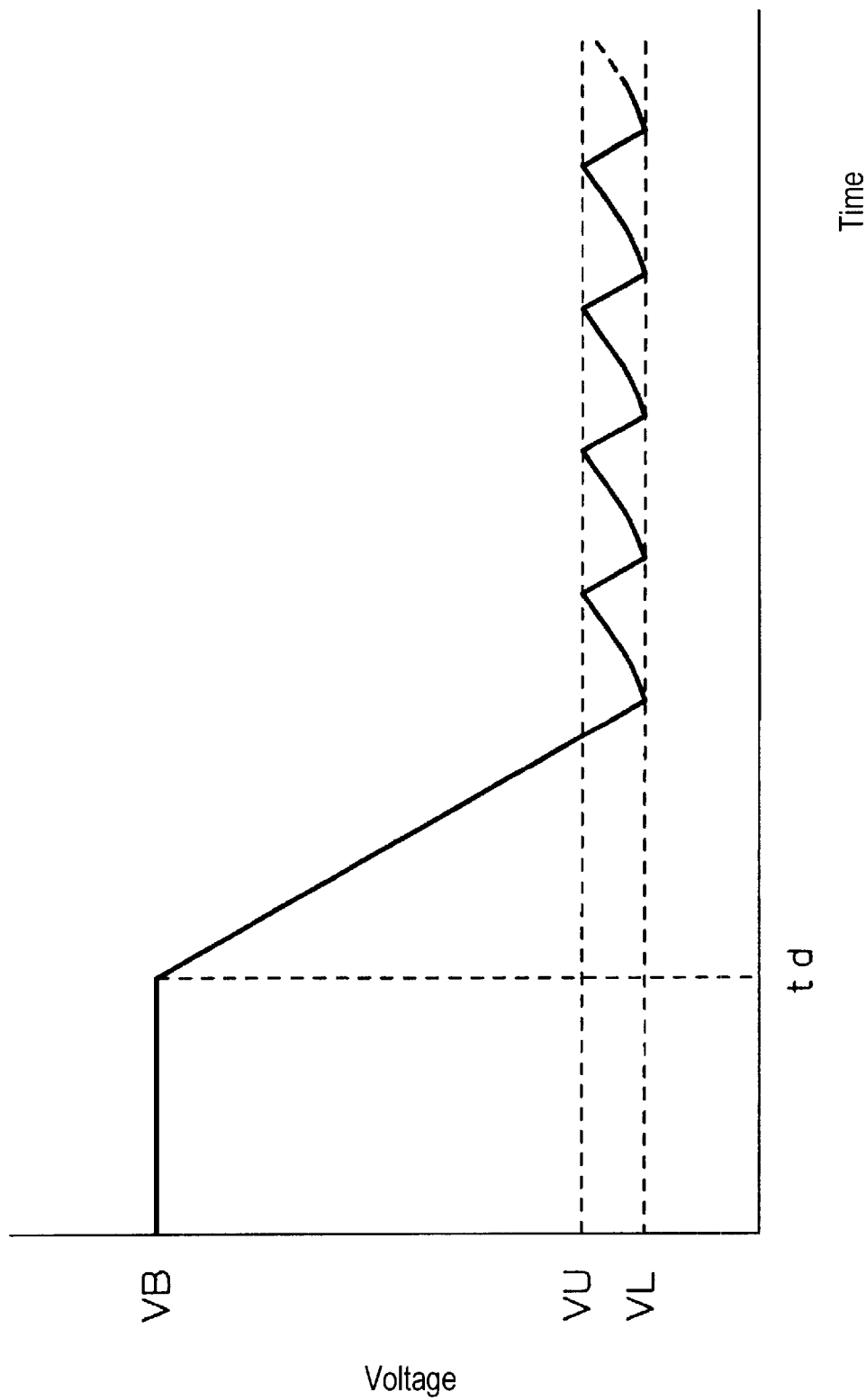
FIG. 12 is a second voltage diagram of the capacitor of the air conditioner according to the fourth to sixth embodiments.

FIG. 12 is a second voltage diagram of capacitor 7. Capacitor 7 is charged by a charging circuit providing a slow rise of a charging current in place of constant-current-charging circuit 15. Since a charging time is longer than that in a conditioner of FIG. 11 including constant-current-charging circuit 15, a repeating frequency of charge and discharge of capacitor 7 becomes lower. This reduces a fluctuation of a current flowing into capacitor 7. As compared with a charging system by a resistor, the repeating frequency of charge and discharge becomes lower since the charging current is limited in both of this system and the system including constant-current-charging circuit 15.

Figure 13:
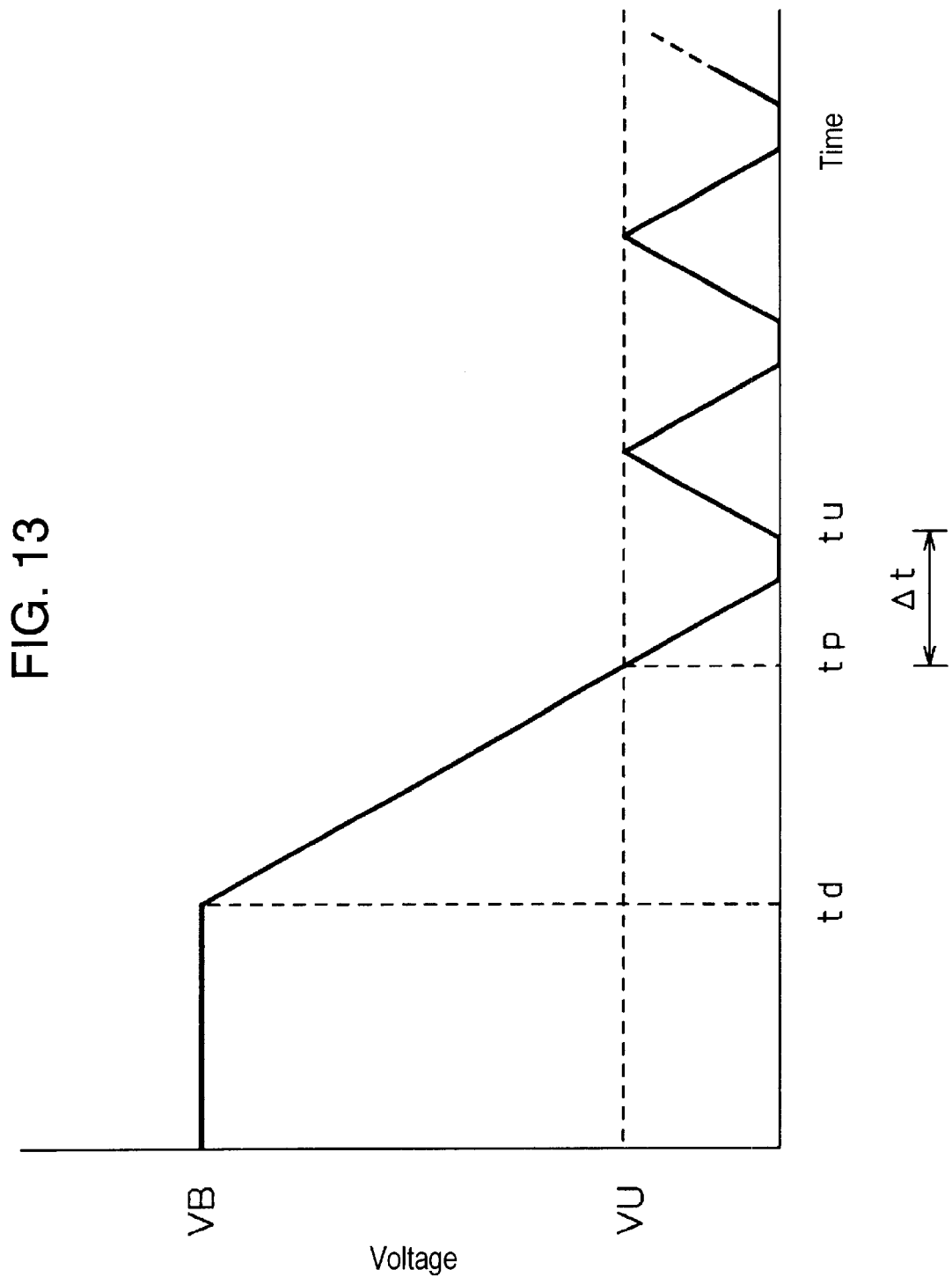
FIG. 13 is a third voltage diagram of the capacitor of the air conditioner according to the fourth to sixth embodiments.

FIG. 13 is a third voltage diagram of capacitor 7. A capacitance of power supply capacitor 20 in FIG. 6 is set to a capacitance supplying a voltage which enables microcomputer 23 (control unit 10) to operate in a predetermined time even when an output voltage of switching power supply 9 (voltage stabilizing circuit 22) becomes 0V.

At time td, control unit 10 stops a power applied to the LED of charge-ON/OFF photocoupler 19. Capacitor 7 starts to be discharged, and the voltage of capacitor 7 is gradually lowered. When the voltage of capacitor 7 reaches voltage VU (at time tp), control unit 10 starts to count time. The voltage of capacitor 7 decreases to 0V. At time tu, when time Δt (the predetermined time) lapses from the start of counting the time, control unit 10 applies a power to the LED of charge-ON/OFF photocoupler 19. Thus, the voltage of capacitor 7 increases. When the voltage of capacitor 7 reaches voltage VU, control unit 10 stops the power applied to the LED of charge-ON/OFF photocoupler 19, and then, the voltage of capacitor 7 decreases. With these operations repeated, the voltage of capacitor 7 is maintained being lower than voltage VU. A capacitance of power supply capacitor 20 and time Δt are set so that microcomputer 23 (control unit 10) is able to continue operating. In this way, a repeating frequency of charge and discharge of capacitor 7 can be sufficiently lowered.

In the air conditioner described above, the voltage of capacitor 7, since being lower than the voltage of battery 1, reduces an electromagnetic wave noise of switching power supply 9. That is, both of switching frequency and pulse voltage are reduced. In inspection and repair after discharging capacitor 7, the capacitor is discharged from a voltage lower than the voltage of battery 1. Therefore, the conditioner may be inspected and repaired fast. Since motor-driven compressor 14, which is driven after charging capacitor 7 is charged, starts operating quickly since capacitor 7 is charged from a voltage which is not 0V.

(Embodiment 5)

Figure 9:
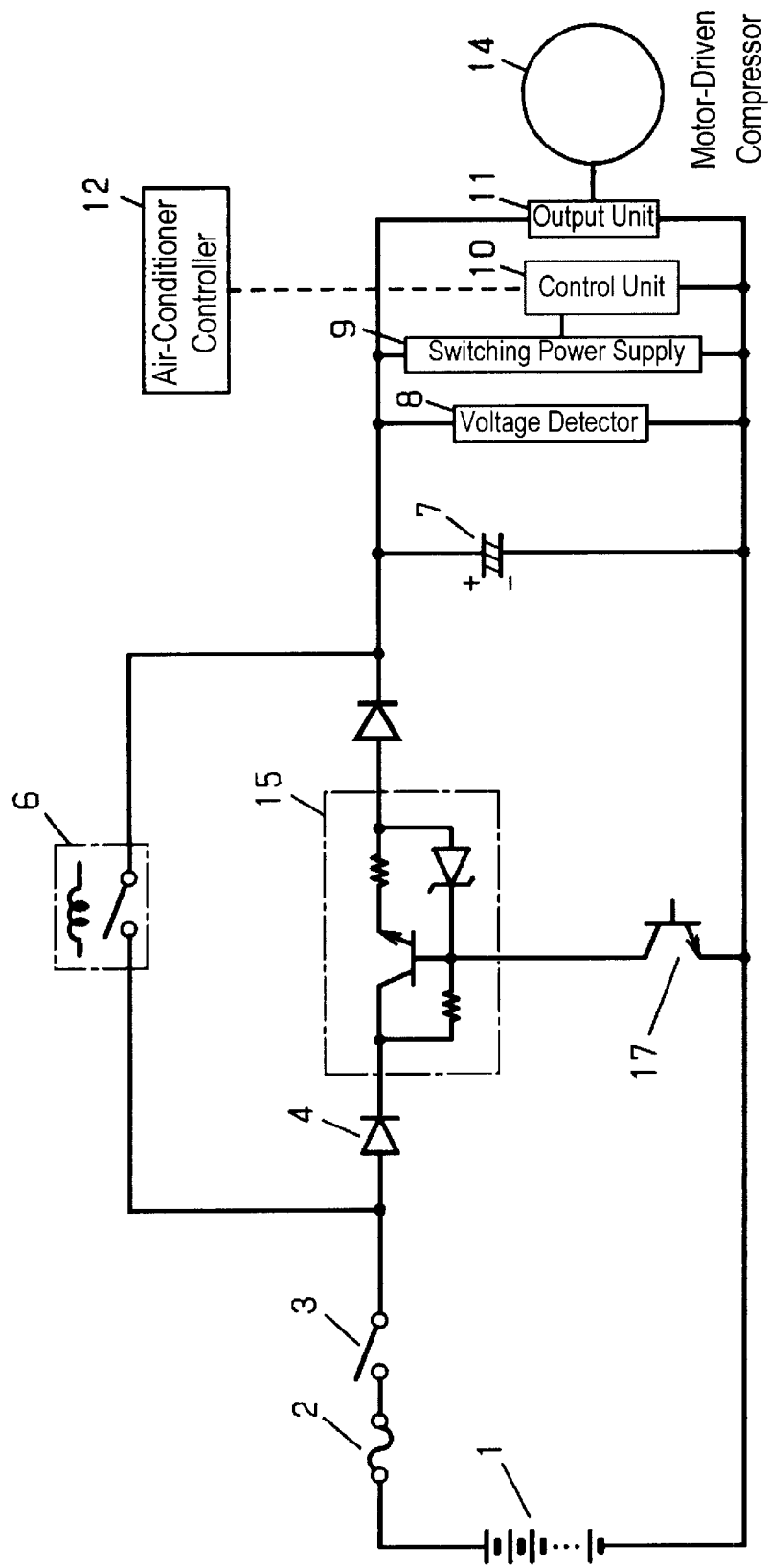
FIG. 9 is a circuit diagram of an air conditioner according to a fifth exemplary embodiment of the invention.

FIG. 9 is a circuit diagram of an air conditioner according to a fifth exemplary embodiment of the present invention. In this air conditioner, transistor 17 is connected to a base of a transistor in constant-current-charging circuit 15 of a conventional air conditioner of FIG. 15, and diode 24 is connected from constant-current-charging circuit 15 to capacitor 7. Turning on transistor 17, control unit 10 can set a base voltage of a transistor in constant-current-charging circuit 15 to 0V and turn off constant-current-charging circuit 15.

This air conditioner has a more simple configuration than that of FIG. 8 in embodiment 4. However, when constantcurrent-charging circuit 15 is turned off, that is, when transistor 17 is turned on, a power is consumed due to a base resistor in constant-current-charging circuit 15. This provides the conditioner with similar advantages to the conditioner in the air conditioner according to embodiment 4.

(Embodiment 6)

Figure 10:
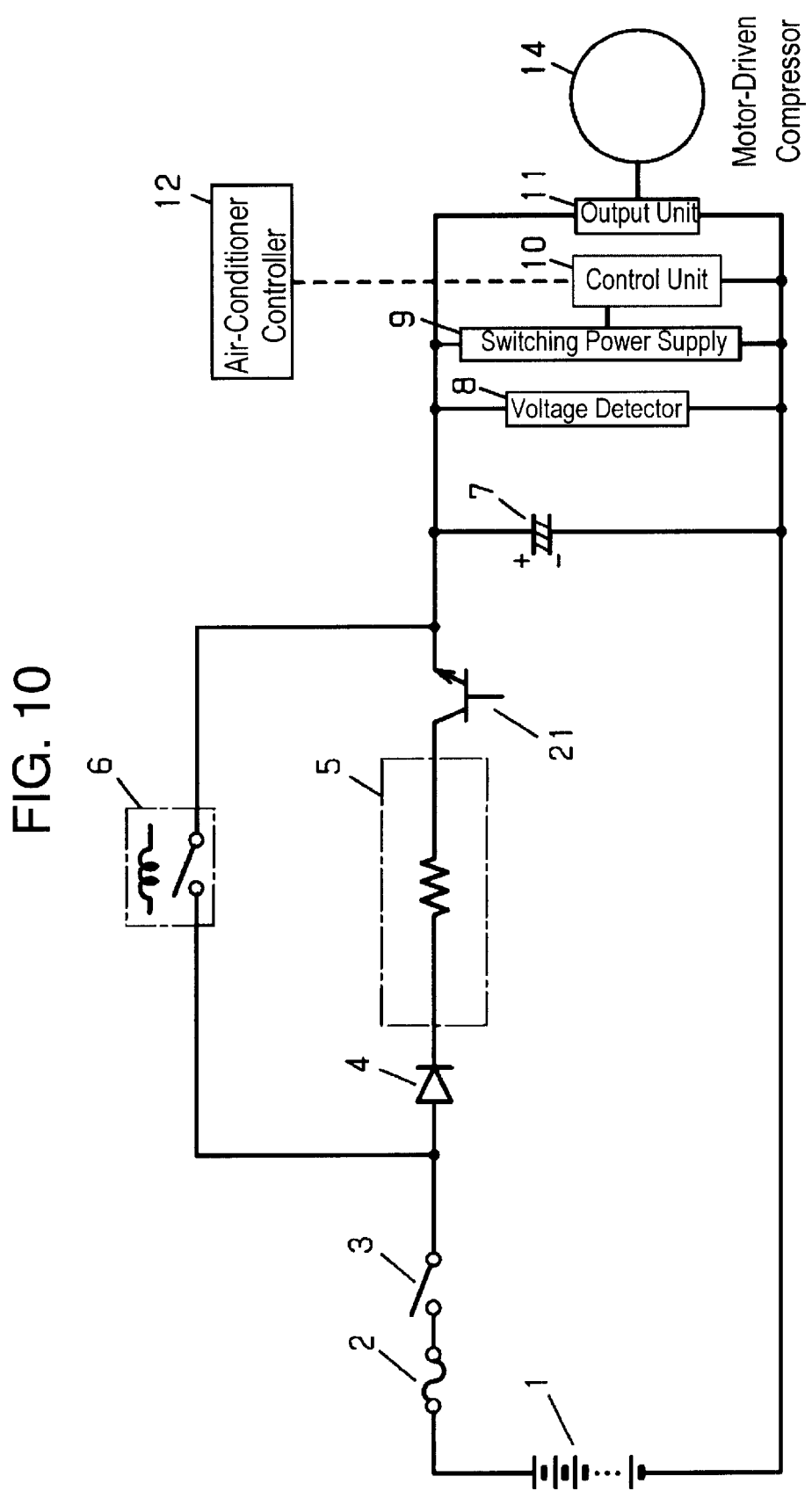
FIG. 10 is a circuit diagram of an air conditioner according to a sixth exemplary embodiment of the invention.

FIG. 10 is a circuit diagram of an air conditioner according to a sixth exemplary embodiment of the present invention. This air conditioner includes a charging resistor 5 in place of constant-current-charging circuit 15 of the conventional air conditioner of FIG. 15, and charge-ON/OFF transistor 21 series-connected to charging resistor 5. Charging of capacitor 7 by charging resistor 5 is controlled by control unit 10 including charge-ON/OFF transistor 21. This provides the conditioner with similar advantages to the conditioner of embodiment 4.

What is claimed is:

1. An air conditioner, comprising:
   - a power application device connected in series to a direct-current (DC) power source;
   - a switch device connected in parallel with said power application device;
   - a capacitor charged by said DC power source via said power application device;
   - a voltage detector for detecting a voltage of said capacitor;
   - an output unit for driving a motor-driven compressor for air conditioning, said output unit receiving a power from said DC power source via said switch device;
   - a control unit for controlling said output unit;
   - a power supply connected in parallel with said capacitor, for supplying a power to said control unit, said power supply receiving a power from said DC power source; and
   - a voltage lowering device for, when said motor-driven compressor does not operate, setting the voltage of said capacitor to a voltage which is lower than a voltage of said DC power source and which allows said control unit to operate, said voltage lowering device being controlled by said controller.

2. The air conditioner of claim 1,
   wherein said controller allows said power application device to function as a stabilized DC power supply and decreases the voltage of said capacitor.

3. The air conditioner of claim 1, wherein said voltage lowering device turns on and off said power application device alternatively.

* * * * *